(12) United States Patent
Shinkawa

(10) Patent No.: US 8,248,670 B2
(45) Date of Patent: Aug. 21, 2012

(54) IMAGE SCANNING DEVICE AND IMAGE FORMING APPARATUS WITH VARYING DOCUMENT SIZE DETECTION PERIODS

(75) Inventor: Shohei Shinkawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 754 days.

(21) Appl. No.: 12/382,846

(22) Filed: Mar. 25, 2009

(65) Prior Publication Data

US 2009/0244649 A1 Oct. 1, 2009

(30) Foreign Application Priority Data

Mar. 28, 2008 (JP) ................................. 2008-086011
Sep. 26, 2008 (JP) ................................. 2008-247925

(51) Int. Cl.
*H04N 1/40* (2006.01)
(52) U.S. Cl. .................. 358/449; 399/189; 399/380
(58) Field of Classification Search .................. 358/449; 399/189, 380
See application file for complete search history.

(56) References Cited

U.S. PATENT DOCUMENTS

| | | | | |
|---|---|---|---|---|
| 7,471,424 | B2* | 12/2008 | Ishido et al. | 358/449 |
| 8,035,865 | B2* | 10/2011 | Ishido et al. | 358/449 |
| 2004/0165223 | A1* | 8/2004 | Ishido et al. | 358/449 |
| 2008/0094668 | A1 | 4/2008 | Matsui | |
| 2009/0080031 | A1* | 3/2009 | Ishido et al. | 358/449 |
| 2009/0122357 | A1* | 5/2009 | Ishido et al. | 358/449 |
| 2009/0323135 | A1* | 12/2009 | Shinkawa | 358/474 |
| 2010/0033769 | A1* | 2/2010 | Shinkawa | 358/474 |

FOREIGN PATENT DOCUMENTS

| | | |
|---|---|---|
| JP | 3168666 | 3/2001 |
| JP | 2006 287901 A | 10/2005 |
| JP | 2005 338685 A | 12/2005 |
| JP | 2006-254182 | 9/2006 |
| JP | 2006 254367 A | 9/2006 |
| JP | 2006 287901 A | 10/2006 |

OTHER PUBLICATIONS

Machine translation of JP 2006-287901 A.*
An English language abstract of Japanese Publication No. 5-207239, published Sep. 21, 2006.
Extended European Search Report dated Jun. 22, 2009 corresponding to European Application No. EP 09 25 0824.

* cited by examiner

*Primary Examiner* — Twyler Haskins
*Assistant Examiner* — Fred Guillermety
(74) *Attorney, Agent, or Firm* — Harness, Dickey & Pierce, P.L.C.

(57) ABSTRACT

An image scanning device includes a document table; a document pressing unit configured to press a document placed on the document table; a scanning unit including a light source for illuminating the document and configured to optically scan the document; an open/close detection unit configured to detect opening and closing of the document pressing unit; and a control unit configured to cause the scanning unit to move parallel to the document and thereby to detect a size of the document when the closing of the document pressing unit is detected by the open/close detection unit or when a scanning start signal is detected. The control unit detects the size of the document within a document size detection period that is changeable according to a speed of closing the document pressing unit, and turns on and off the light source based on the document size detection period.

8 Claims, 13 Drawing Sheets

IMAGE SCANNING DEVICE AND IMAGE FORMING APPARATUS WITH VARYING DOCUMENT SIZE DETECTION PERIODS

BACKGROUND OF THE INVENTION

1. Field of the Invention

A certain aspect of the present invention relates to an image scanning device and an image forming apparatus including the image scanning device.

2. Description of the Related Art

In a typical optical image scanning device, a document placed on a contact glass used as a document table is illuminated and light reflected from the document is detected by a CCD image sensor.

Normally, scanning parameters such as a linear scanning speed and a scanning distance are determined based on settings such as a document size, a resize ratio, and a scan density. Those settings are preferably performed automatically by the image scanning device rather than manually by the user to improve user convenience and to prevent setting errors.

For example, patent document 1 discloses a method for automatically detecting a document size. In the disclosed method, the size in the main-scanning direction of a document is determined based on image data obtained by a CCD image sensor and the size in the sub-scanning direction is determined based on an output from a document detection sensor.

Also, patent document 2 discloses an image scanning device that detects opening and closing of a document pressing unit and causes a scanning unit to detect the size of a document if the document pressing unit is being closed. This configuration makes it possible to detect a document size at an appropriate timing according to user operations.

[Patent document 1] Japanese Patent No. 3168666
[Patent document 2] Japanese Patent Application Publication No. 2006-254182

However, the related art technologies described above have some disadvantages. For example, there is a case where a document size detection process is not completed while the document pressing unit is being closed and the back surface of the document pressing unit is mistakenly detected as a document even if no document is placed on the document table. This problem may be solved, for example, by providing, in addition to an open/close detection unit for detecting opening and closing of the document pressing unit, a sensor for detecting that the document pressing unit has entered a document detection range of the CCD image sensor. When the document pressing unit is out of the document detection range, the CCD image sensor does not mistakenly detect the back surface of the document pressing unit as a document. However, this configuration increases the costs of an image scanning device.

SUMMARY OF THE INVENTION

Aspects of the present invention provide an image scanning device and an image forming apparatus including the image scanning device that solve or reduce one or more problems caused by the limitations and disadvantages of the related art.

According to an aspect of the present invention, an image scanning device includes a document table; a document pressing unit configured to press a document placed on the document table; a scanning unit including a light source for illuminating the document and configured to optically scan the document; an open/close detection unit configured to detect opening and closing of the document pressing unit; and a control unit configured to cause the scanning unit to move parallel to the document and thereby to detect a size of the document when the closing of the document pressing unit is detected by the open/close detection unit or when a scanning start signal is detected. The control unit is configured to detect the size of the document within a document size detection period that is changeable according to a speed of closing the document pressing unit, and to turn on and off the light source based on the document size detection period.

DESCRIPTION OF THE PREFERRED EMBODIMENTS

Preferred embodiments of the present invention are described below with reference to the accompanying drawings.

Figure 1:
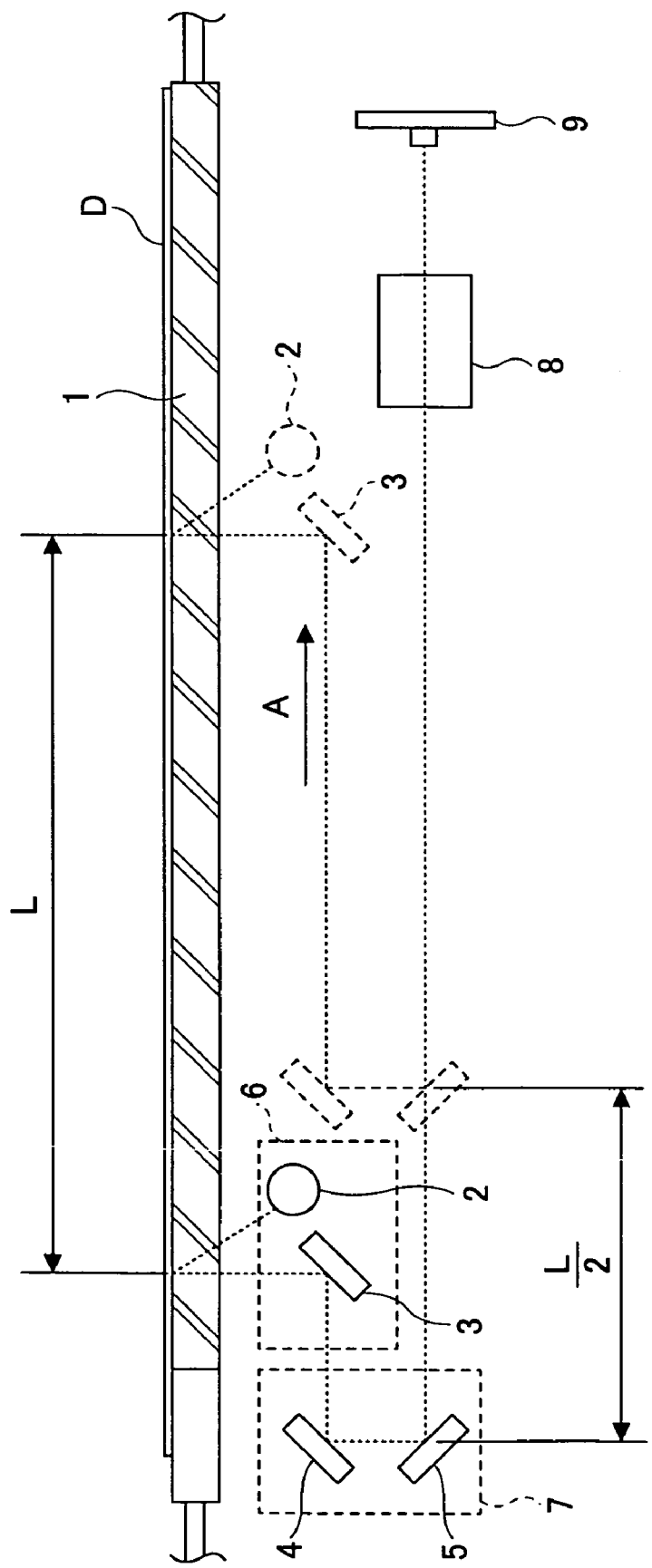
FIG. 1 is a schematic diagram of an image scanning device according to an embodiment of the present invention.

FIG. 1 is a schematic diagram of an image scanning device according to an embodiment of the present invention. Referring to FIG. 1, a lamp (light source) 2 illuminates a document D placed on a contact glass (document table) 1. The light reflected from the document D is guided by a first mirror 3, a second mirror 4, and a third mirror 5 to a lens 8. Then, the light is focused by the lens 8 onto a charge-coupled device (CCD) 9.

The image scanning device is configured such that the lamp 2 and the first mirror 3 move a distance L while the second mirror 4 and the third mirror 5 move a distance L/2. This configuration makes it possible to scan the entire document while keeping the optical path length of the optical system constant.

Figure 2:
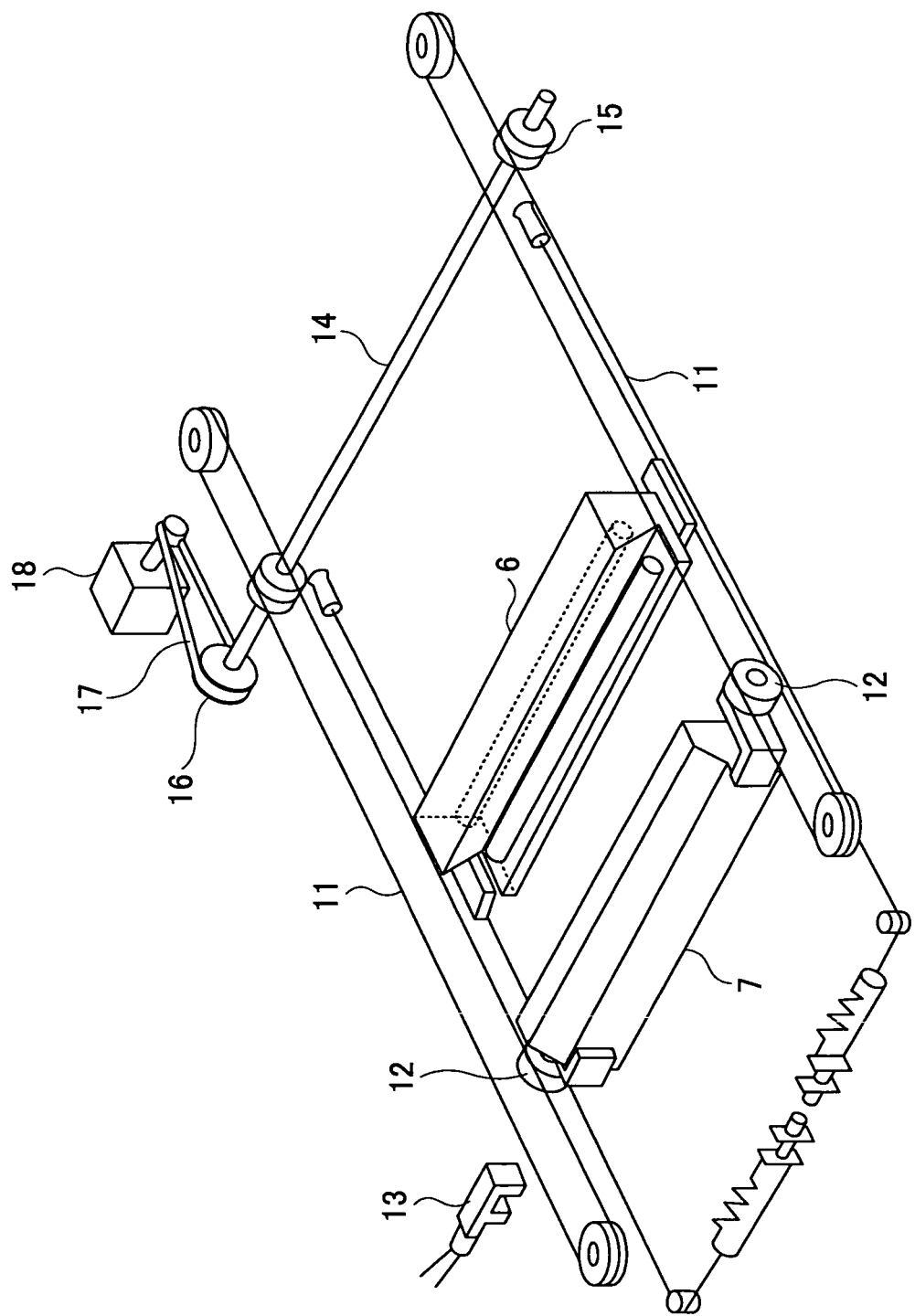
FIG. 2 is a perspective view illustrating a drive mechanism of the image scanning device shown in FIG. 1.

FIG. 2 is a perspective view illustrating a drive mechanism of the image scanning device shown in FIG. 1. As shown in FIG. 2, a first carriage 6 including the lamp 2 and the first mirror 3 is attached to drive wires 11, and a second carriage 7 including the second mirror 4 and the third mirror 5 is connected to the drive wires 11 via pulleys 12. The drive wires 11 are wound around wire pulleys 15 connected to a drive shaft 14. Torque generated by a drive motor 18 is transmitted via a timing belt 17 and a timing pulley 16 to the drive shaft 14.

The first carriage 6 is moved further a distance after its one end passes by a home position sensor 13 and is thereby placed in a home position. The first carriage 6 and the second carriage 7 collectively function as a scanning unit for scanning a document and detecting a document size.

Figure 3:
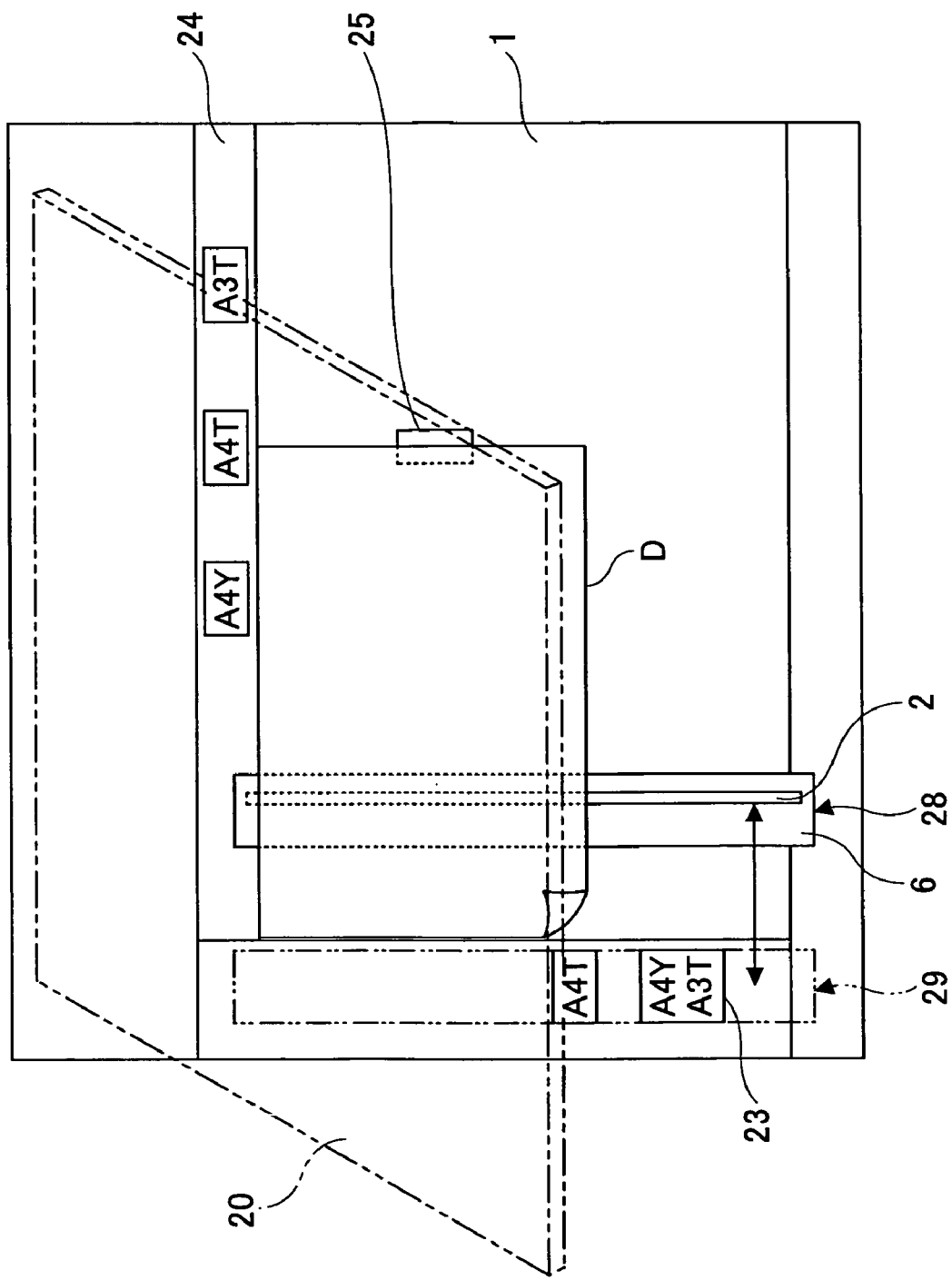
FIG. 3 is a plan view of an image scanning device.
Figure 4:
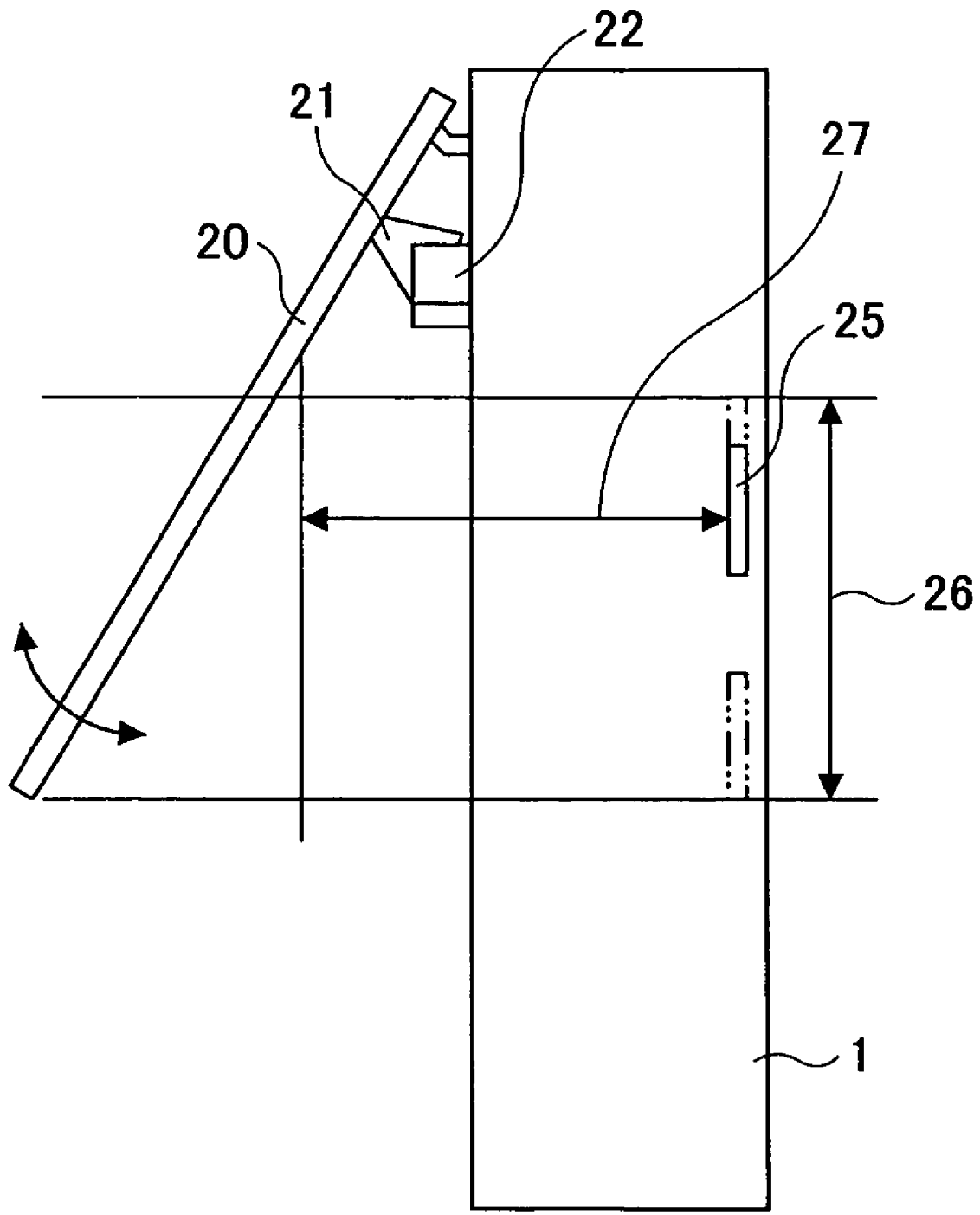
FIG. 4 is a side view of the image scanning device shown in FIG. 3.

FIG. 3 is a plan view of the image scanning device of this embodiment, and FIG. 4 is a side view of the image scanning device shown in FIG. 3. As shown in FIGS. 3 and 4, the image scanning device of this embodiment includes a document pressing unit 20 for pressing the document D against the contact glass 1, a filler 21 that moves along with the document pressing unit 20, and a photo interrupter sensor 22 for detecting the filler 21. The filler 21 and the photo interrupter sensor 22 collectively function as an open/close detection unit for detecting opening and closing of the document pressing unit 20.

The document pressing unit 20 is composed of parts that do not allow light to pass through. In this embodiment, if the filler 21 is inserted into and detected by the photo interrupter sensor 22, it is determined that the document pressing unit 20 is being closed to cover the upper surface of the contact glass 1.

The image scanning device of this embodiment also includes document size scales 23 and 24 that indicate predefined sizes of documents and a document size sensor 25 for detecting the size in the sub-scanning direction of a document. Also in FIGS. 3 and 4, 26 indicates a sensor installation range within which the document size sensor 25 is installed (so that the document pressing unit 20 is located above the document size sensor 25), 27 indicates a document detection range of the document size sensor 25 (out of which, the document size sensor 25 cannot detect the document pressing unit 20), 28 indicates a document size detection position of the first carriage 6, and 29 indicates a document scanning wait position (home position) of the first carriage 6.

Figure 5:
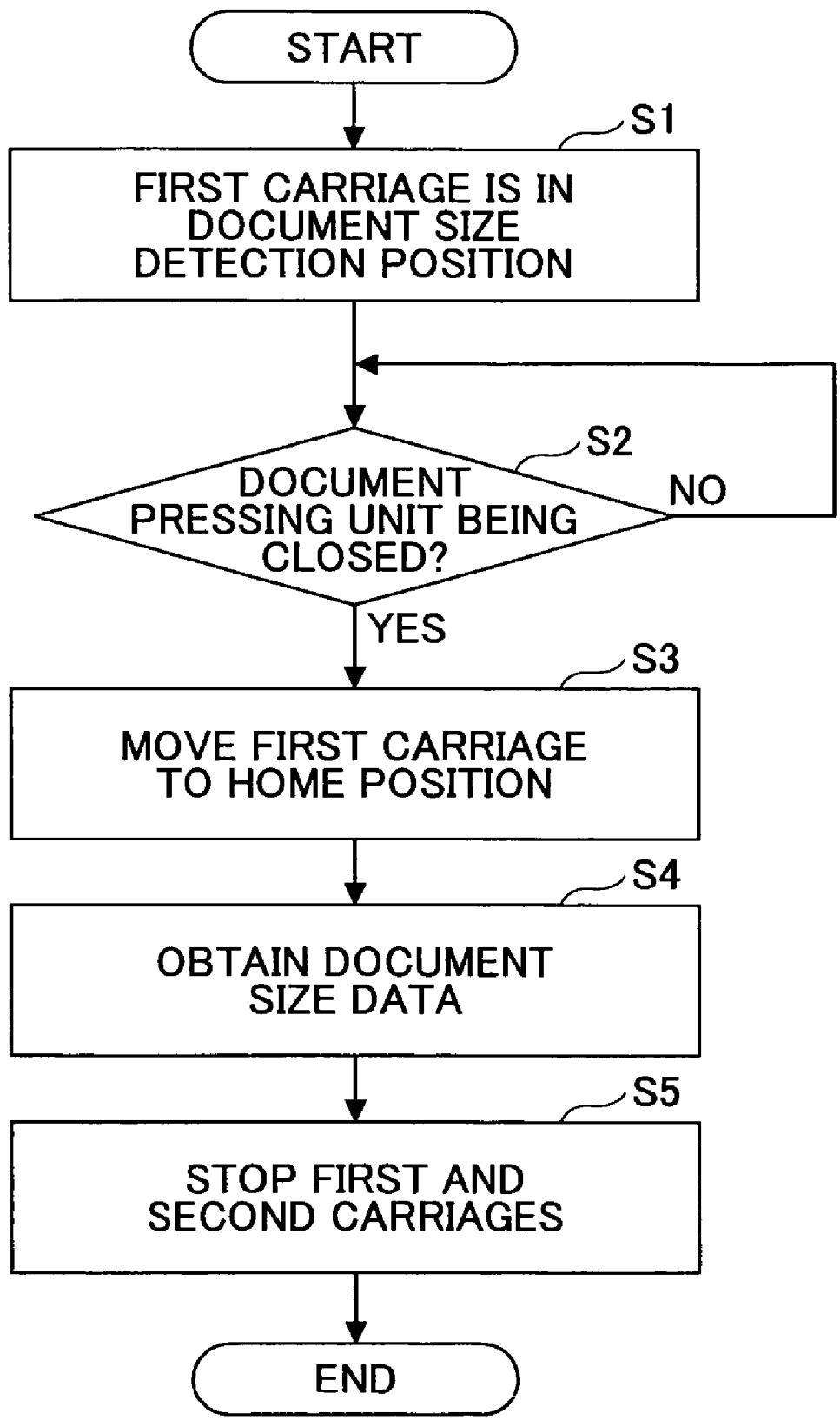
FIG. 5 is a flowchart showing a basic document size detection process according to an embodiment of the present invention.

A basic document size detection process of this embodiment is described below with reference to FIG. 5. The document size detection process described below is controlled (performed) by a control unit (not shown) implemented by a CPU of the image scanning device.

If the open/close detection unit (the filler 21 and the photo interrupter sensor 22) detects that the document pressing unit 20 is being closed (S2) while the first carriage 6 is in the document size detection position 28 (S1), the control unit turns on the lamp 2 of the first carriage 6 and moves the first carriage 6 from the document size detection position 28 to the document scanning wait position 29 (home position) (S3). Then, the control unit causes the first carriage 6 in conjunction with the second carriage 7 to scan the document D multiple times in the sub-scanning direction to obtain document size data in the main-scanning direction (S4). After obtaining the document size data in the main-scanning direction, the control unit stops the first and second carriages 6 and 7 (S5).

The document size data may be either continuous data or a collection of partial data sets. Scanning a document multiple times makes it possible to improve the accuracy in detecting the document size. The presence of a document is determined, for example, by comparing the luminance of respective dots in the document size data with a threshold. If the luminance of a dot is greater than the threshold, it indicates that a document is present at the corresponding position.

Also, if the open/close detection unit detects that the document pressing unit 20 is being closed, the control unit causes the document size sensor 25 to obtain document size data in the sub-scanning direction. Then, the control unit determines a document size (dimensions) based on the document size data in the main-scanning direction and the document size data in the sub-scanning direction.

In this embodiment, the document size sensor 25 is used to detect a document size in the sub-scanning direction. If a light source such as a fluorescent lamp emitting disturbing light is present above the document size sensor 25, the disturbing light may affect the detection result of the document size sensor 25. Therefore, it is preferable to adjust the positions of the filler 21 and the photo interrupter sensor 22 such that the filler 21 enters the photo interrupter sensor 22 after the document pressing unit 20 reaches an angle at which the document pressing unit 20 can shield the document size sensor 25 from the disturbing light.

The document size sensor 25 also detects whether a document is present on the contact glass 1. If closing of the document pressing unit 20 is detected when the document pressing unit 20 is close to the contact glass 1, i.e., in the detection range of the document size sensor 25, the document size sensor 25 may mistakenly detect the document pressing unit 20 as a document. To prevent or minimize this problem, it is preferable to adjust the positions of the filler 21 and the photo interrupter sensor 22 such that the filler 21 enters the photo interrupter sensor 22 while the document pressing unit 20 is still outside of the detection range of the document size sensor 25.

This also applies to a case where a document size is detected by the scanning unit and the CCD 9. If the scanning unit is driven when the document pressing unit 20 is too close to the contact glass 1, the CCD 9 may mistakenly detect the document pressing unit 20 as a document.

Figure 6:
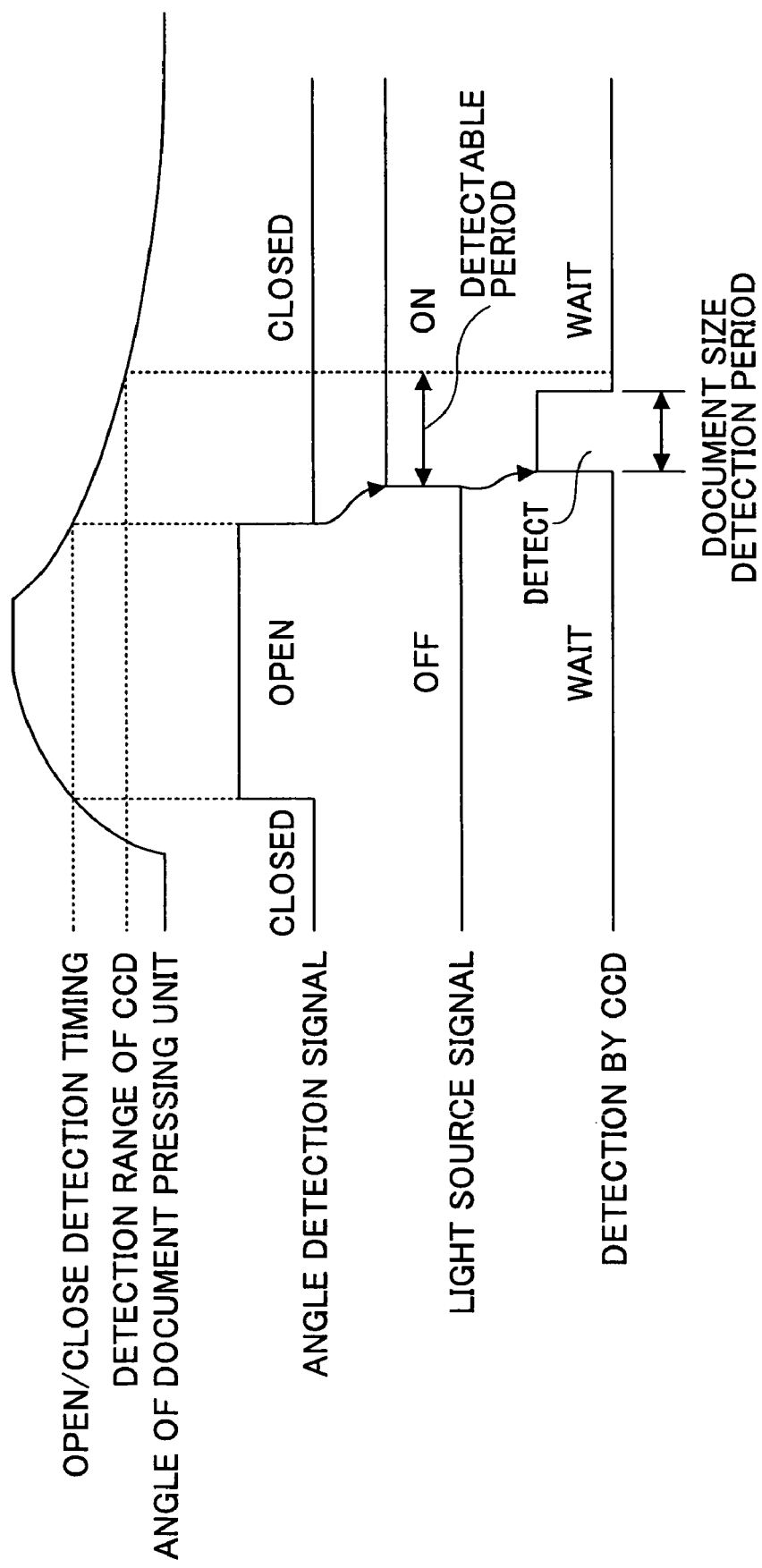
FIG. 6 is a timing chart showing a document size detection process according to a first embodiment of the present invention.

A first embodiment of the present invention is described below with reference to FIGS. 6, 7, and 8. FIG. 6 is a timing chart showing a document size detection process. In the timing chart, the document pressing unit 20 is opened, a document is placed by a user, and then the document pressing unit 20 is closed. A document size detection process can be performed during a period (detectable period) from when the light source (lamp 2) is turned on to when the document pressing unit 20 enters the detection range of the CCD 9 (this is detected by the filler 21 and the photo interrupter sensor 22).

Figure 7:
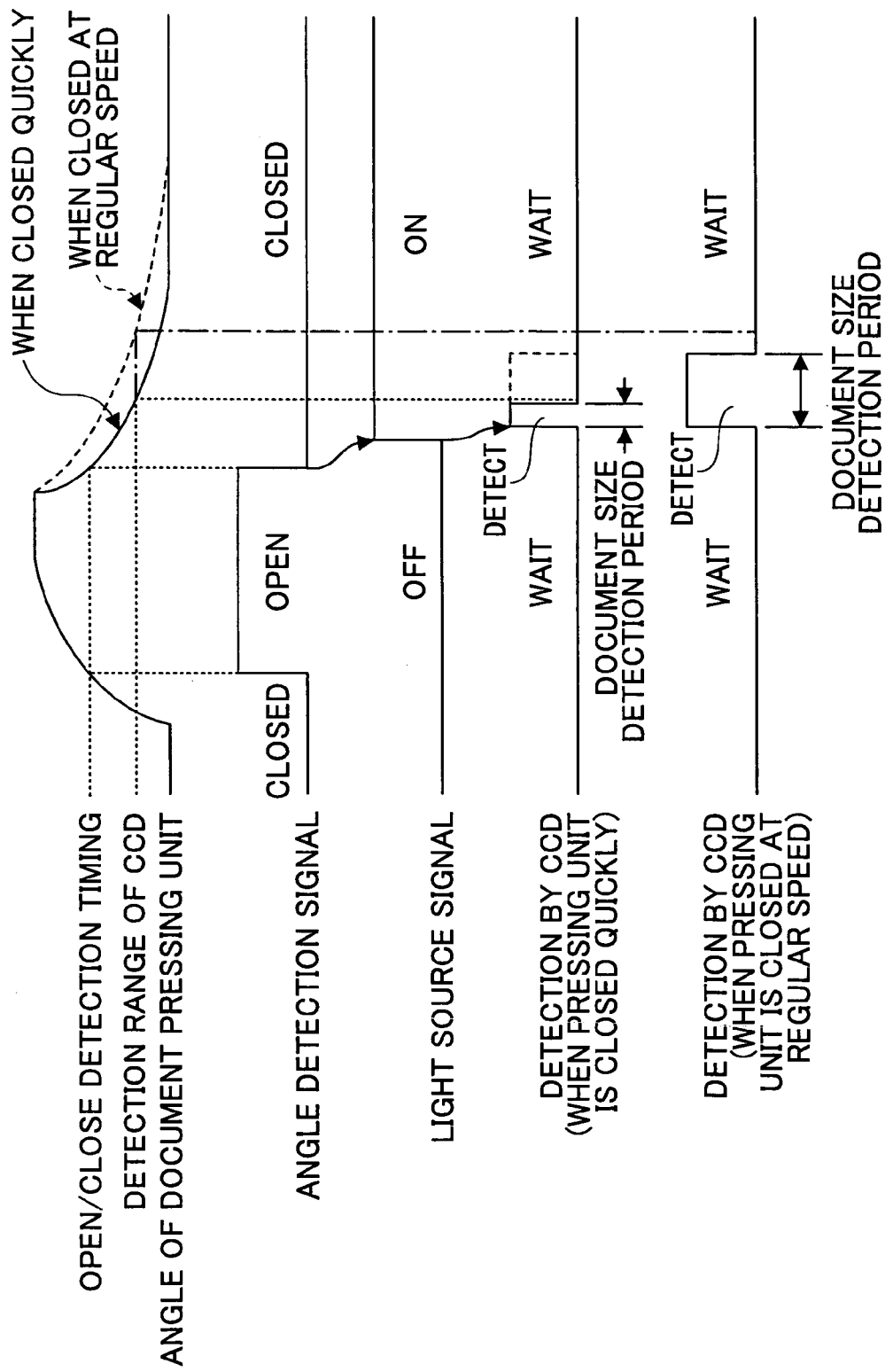
FIG. 7 is a timing chart showing a document size detection process of the first embodiment in a case where a document pressing unit is closed quickly.

FIG. 7 is a timing chart showing a document size detection period in a case where the document pressing unit 20 is closed quickly (indicated by a solid line) and a document size detection period in a case where the document pressing unit 20 is closed at regular speed (indicated by a dotted line). Here, the document size detection period indicates an amount of time used by the control unit to detect a document size with the CCD 9. In FIG. 7, document size detection periods corresponding to different speeds of closing the document pressing unit 20 are indicated by separate lines to avoid confusion (this also applies to other timing charts used for later descriptions). If the document size detection period is fixed and the document pressing unit 20 is closed quickly as indicated by a solid line in FIG. 7, the document size detection process is not completed before the document pressing unit 20 enters the detection range of the CCD 9. As a result, the CCD 9 mistakenly detects the back surface of the document pressing unit 20 as a document even if no document is present. For this reason, the document size detection period (or the actual sampling time) is preferably set at a small value for users who tend to close the document pressing unit 20 quickly, to reduce the detection error rate.

Figure 8:
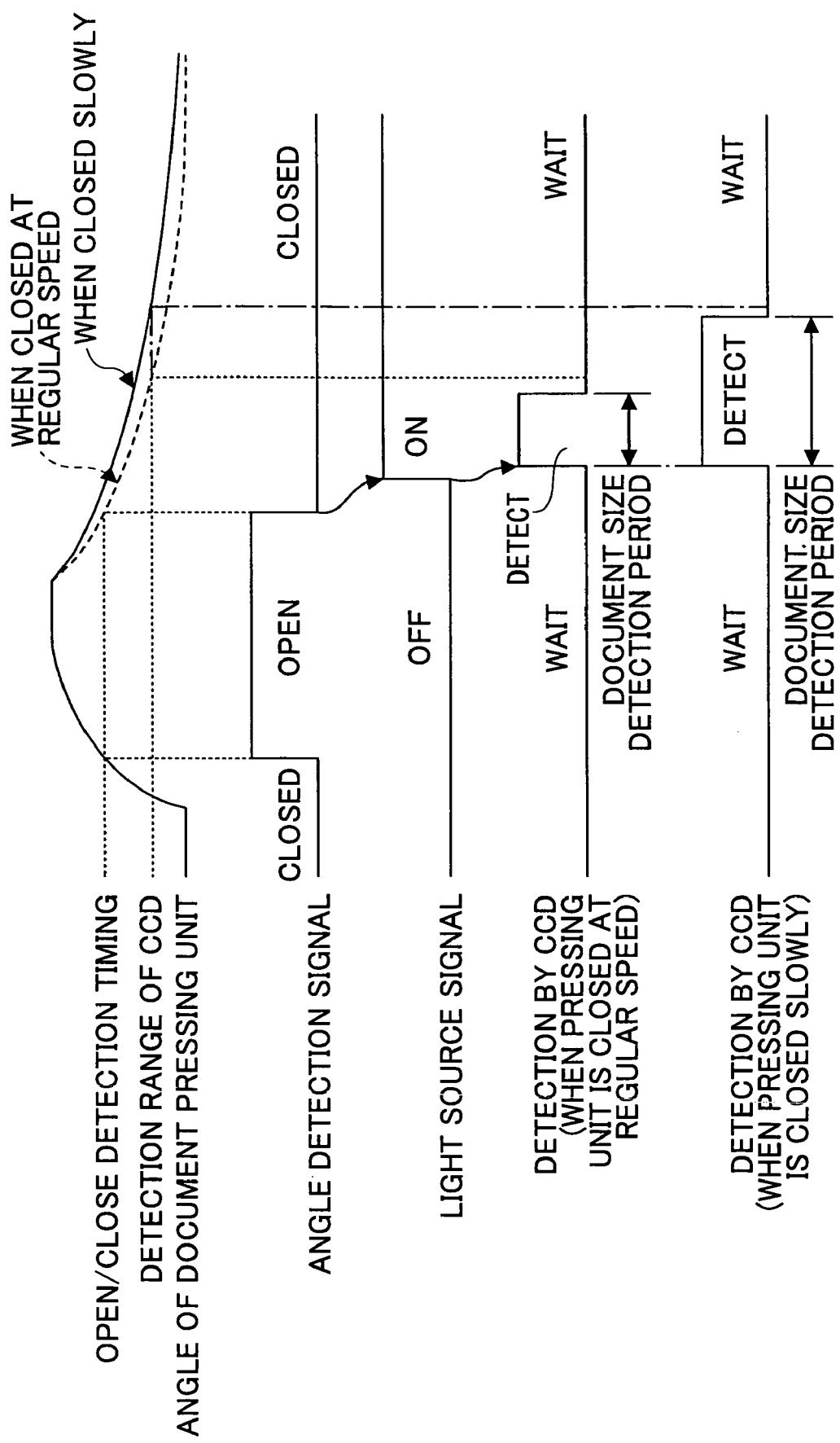
FIG. 8 is a timing chart showing a document size detection process of the first embodiment in a case where a document pressing unit is closed slowly.

FIG. 8 is a timing chart showing a document size detection period in a case where the document pressing unit 20 is closed slowly (indicated by a solid line) and a document size detection period in a case where the document pressing unit 20 is closed at regular speed (indicated by a dotted line). In FIG. 8, in contrast to the case shown in FIG. 7, the document size detection period is set at a larger value for users who tend to close the document pressing unit slowly. In this case, the detection accuracy is improved since the sampling time in the document size detection period is increased.

The document size detection period or the sampling time may be set according to the speed of closing the document pressing unit 20 using, for example, a serviceman program (SP) mode of an operations unit (not shown) of the image scanning device.

Figure 9:
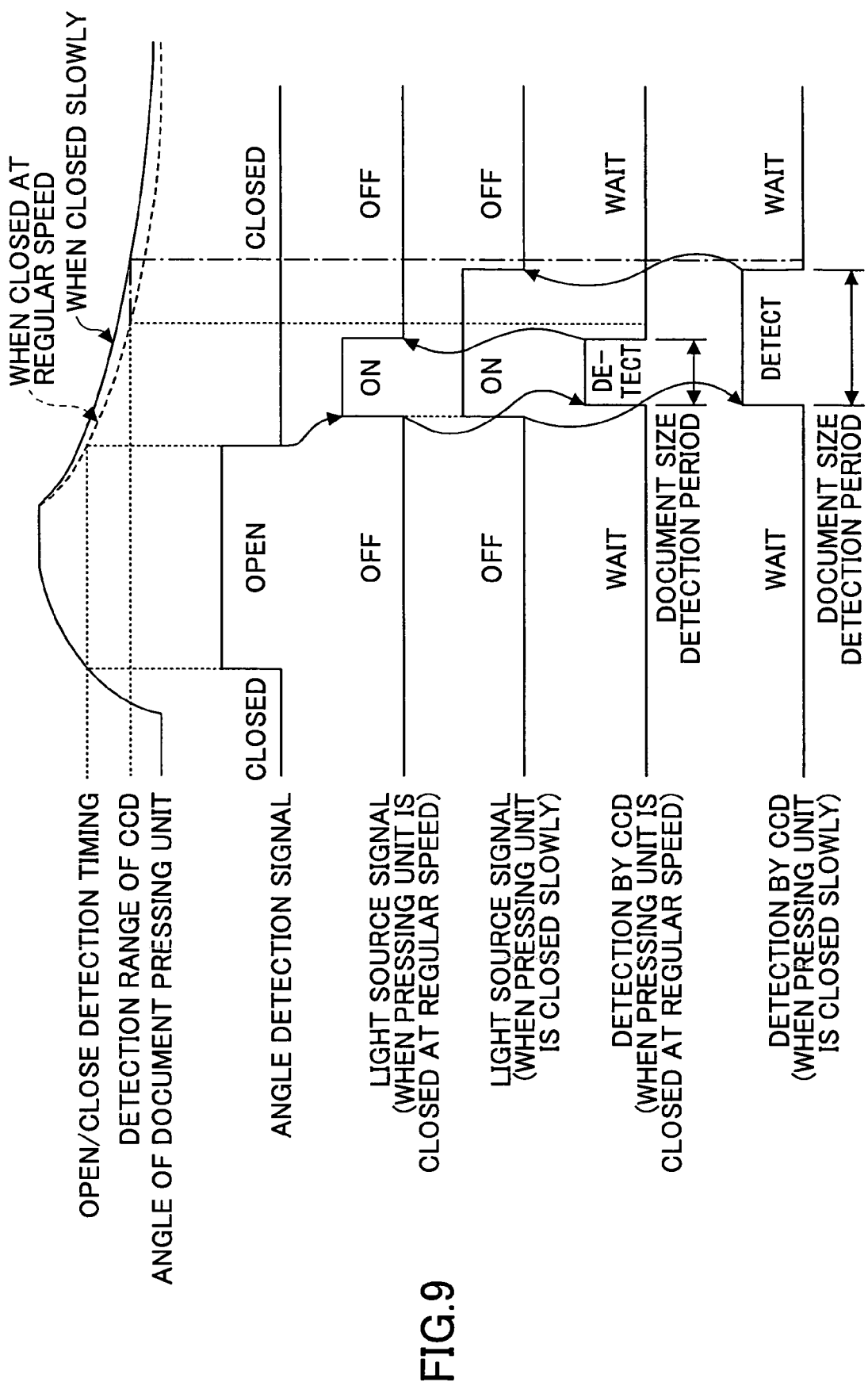
FIG. 9 is a timing chart showing a light source signal in a document size detection process of the first embodiment.

In the examples shown in FIGS. 7 and 8, a light source signal is turned on even after the document size detection process is completed. However, the present invention is not limited to those examples. For example, as shown in FIG. 9, the light source signal may be turned off when the document size detection process is completed. In this case, the timing to turn off the light source is changed as the document size detection period is changed.

Thus, the above embodiment makes it possible to change the document size detection period according to the manner in which the document pressing unit 20 is operated (e.g., the speed of closing the document pressing unit 20) and thereby to reduce errors in document size detection. This configuration in turn makes it possible to accommodate mechanical variations (e.g., mounting positions of the filler 21 and the photo interrupter sensor 22) of the image scanning device. Also, the above embodiment makes it possible to turn on and off the light source according to the document size detection period. This makes it possible to reduce power consumption and to minimize the period of time during which light from the light source enters the eyes of the user.

Figure 10:
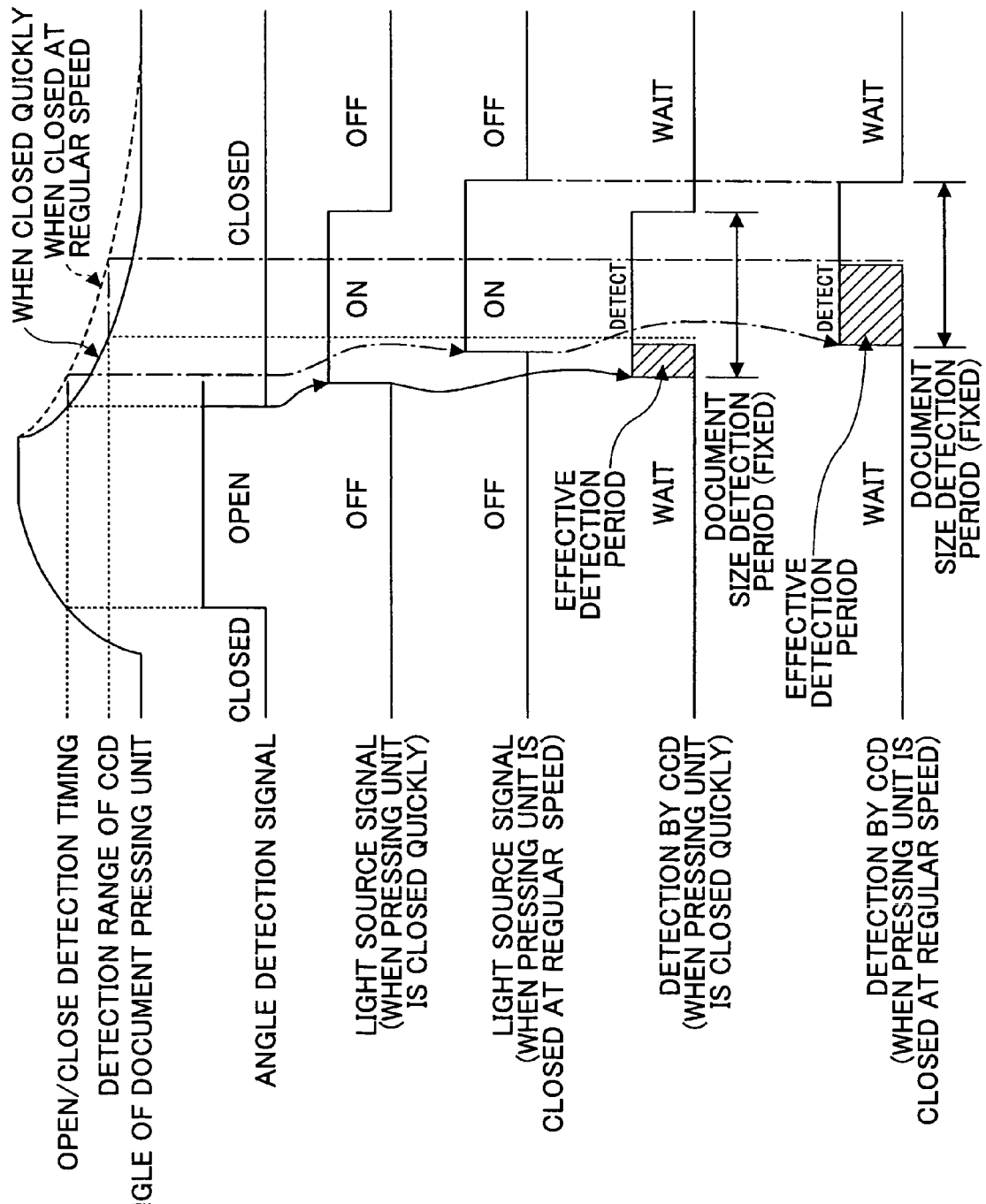
FIG. 10 is a timing chart showing a document size detection process according to a second embodiment of the present invention.

A second embodiment of the present invention is described below with reference to FIG. 10. FIG. 10 is a timing chart showing a document size detection process. In the second embodiment, as shown in FIG. 10, the document size detection period and a lighting period (during which the light source is turned on) are fixed and an effective detection period in the document size detection period is varied. The effective detection period indicates a period of time actually used for document size detection in the document size detection period. The effective detection period can be changed according to the speed of closing the document pressing unit 20. Similar to the first embodiment, the effective detection period may be changed using the operations unit of the image scanning device.

The second embodiment makes it possible to change the effective detection period, during which a document size detection process is performed, according to the manner of operating the document pressing unit 20 by the user (e.g., the speed of closing the document pressing unit 20) and thereby makes it possible to reduce errors in document size detection while eliminating the need to change the lighting period of the light source.

Next, a third embodiment of the present invention is described. As described above, to correctly detect a document size in the sub-scanning direction with the document size detection sensor 25, it is preferable to drive the document size detection sensor 25 (cause the sensor 25 to detect the document size) at a timing when the document pressing unit 20 is still outside of the detection range of the document size sensor 25. However, if the document size detection sensor 25 is driven at a timing (closing detection timing) when the open/close detection unit detects closing of the document pressing unit 20, the lamp 2 is turned on while the document pressing unit 20 is at a large angle with the contact glass 1. As a result, light emitted from the lamp 2 may enter the eyes of the user and cause the user to feel uncomfortable.

In the third embodiment, to solve or reduce this problem, the control unit turns on the lamp 2 after a lighting delay period t from the closing detection timing. This configuration makes it possible to turn on the lamp 2 when the document pressing unit 20 is at an angle that is large enough to prevent the document size detection sensor 25 from mistakenly detecting the document pressing unit 20 as a document and that is small enough to reduce the amount of light entering the eyes of the user.

Figure 11:
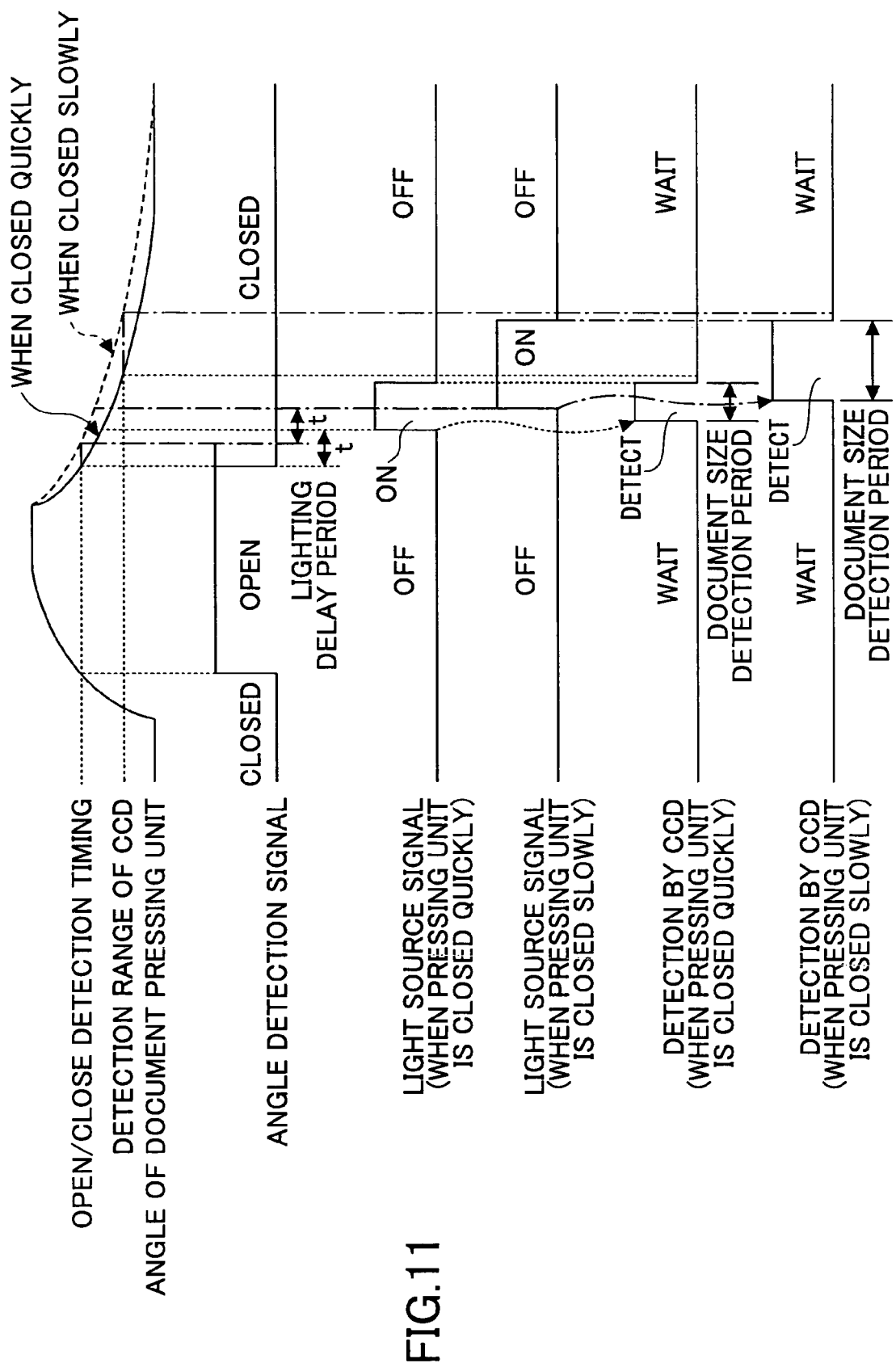
FIG. 11 is a timing chart showing a document size detection process where a document size detection period is variable according to a third embodiment of the present invention.
Figure 12:
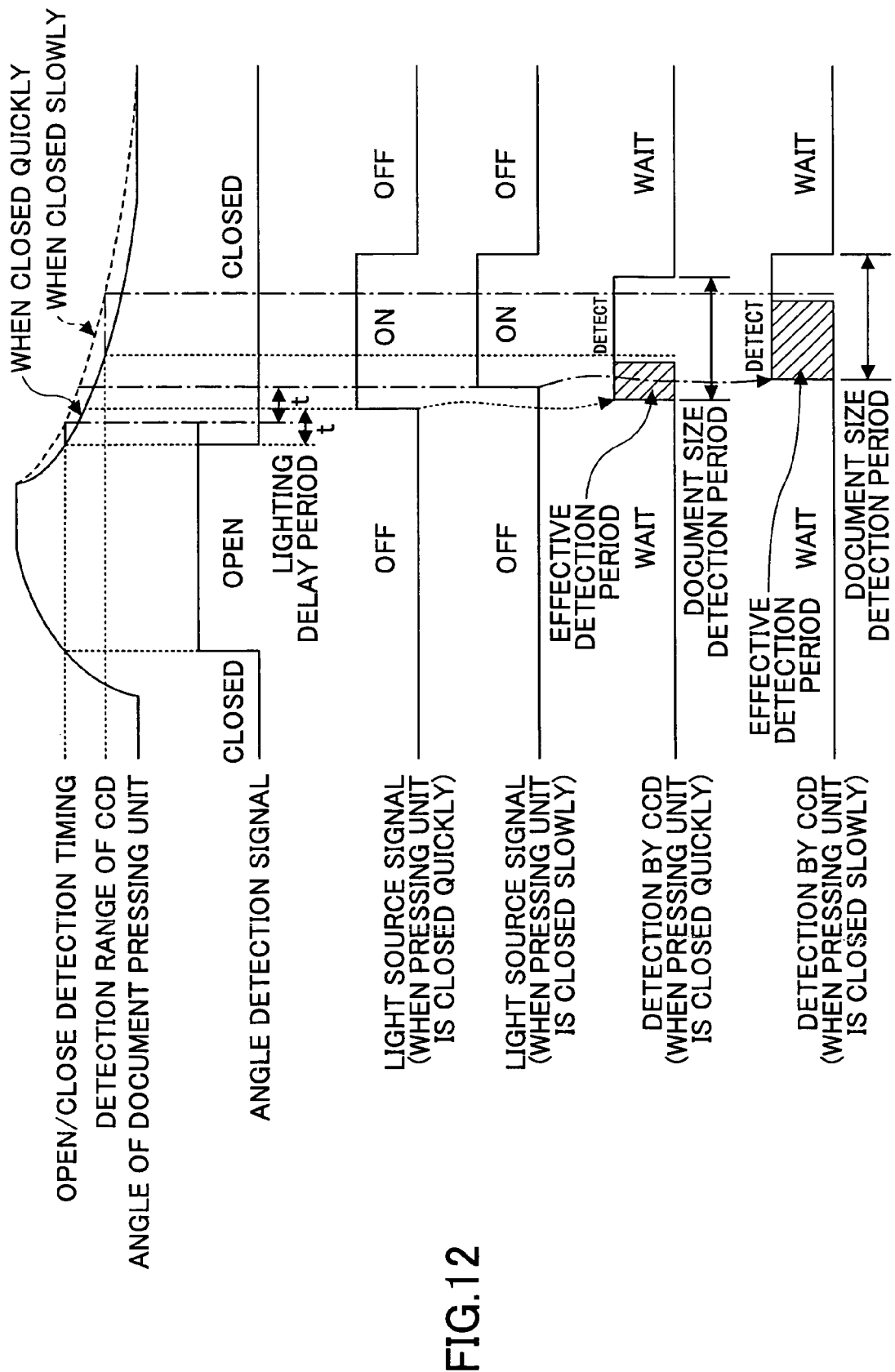
FIG. 12 is a timing chart showing a document size detection process where an effective document size detection period is variable according to the third embodiment.

The third embodiment may be combined with the first and second embodiments. For example, the document size detection period may be changed as shown in FIG. 11 or the effective detection period may be changed as shown in FIG. 12.

Next, a fourth embodiment of the present invention is described. There are many types of document pressing units used for an image scanning device. Examples of document pressing units include an automatic document feeder (ADF), an automatic reversing document feeder (ARDF), and a pressing plate. Such document pressing units have different weights (heavy, normal, light) and sizes. Therefore, the speed of closing those document pressing units varies even when they are operated by the same user. Also, the speed of closing a document pressing unit varies depending on the user (healthy person, wheelchaired person, etc.). Further, the closing detection timing of the open/close detection unit varies depending on the mounting position and shape of a filler (filler 21).

For this reason, in the fourth embodiment, the document size detection period or the effective detection period is changed according to the type of document pressing unit and/or depending on the user who operates the document pressing unit. Each type of document pressing unit may be associated with a document size detection period or an effective detection period and selected, for example, using the SP mode of the operations unit of the image scanning device. Still in this case, the document size detection period or the effective detection period for each type of document pressing unit is preferably changeable.

Thus, the fourth embodiment makes it possible to set a document size detection period or an effective detection period suitable for the type of document pressing unit and/or the type of user and thereby to reduce detection errors. This in turn makes it possible to set an appropriate document size detection period or effective detection period according to the mounting position and shape of the filler of the document pressing unit.

The image scanning device of this embodiment may also be configured to determine the type of user by detecting, for example, the height or position of the user with a sensor and to select a document size detection period or an effective detection period based on the determined type of user from a table defining multiple document size detection periods or effective detection periods.

Next, a fifth embodiment of the present invention is described. In the fourth embodiment described above, the document size detection period or the effective detection period is determined based on the type of document pressing unit. According to the fifth embodiment, the control unit of the image scanning device is configured to automatically detect the type of document pressing unit by, for example, communicating with the document pressing unit via a connector and to select a document size detection period or an effective detection period suitable for the detected type of document pressing unit. Still in this case, the document size detection period or the effective detection period for each type of document pressing unit is preferably changeable.

Thus, the fifth embodiment makes it possible to automatically set a document size detection period or an effective detection period suitable for the type of document pressing unit and thereby to reduce detection errors. This in turn makes it possible to set an appropriate document size detection period or effective detection period according to the mounting position and shape of the filler of the document pressing unit.

Next, a sixth embodiment of the present invention is described. In the first through fifth embodiments, a document size detection process is performed when the open/close detection unit detects closing of the document pressing unit 20. However, there is a case where a document is processed (e.g., copied) with the document pressing unit 20 opened. In such a case, since there is no possibility that the back surface of the document pressing unit 20 is mistakenly detected as a document, the document size detection period or the effective detection period can be set at a large value. For example, when a copy start button is pressed and a scanning start signal is detected while the document pressing unit 20 is open, the control unit uses the maximum detection period to detect a document size regardless of the document size detection period or the effective detection period that is set as described in the first through fifth embodiments.

The maximum detection period is preferably set at a value corresponding to the time necessary for the scanning unit to exceed the boundary of a document scanning area. Alternatively, instead of using the fixed maximum detection period, the detection period used when the document pressing unit 20 is open may be set freely.

Thus, the sixth embodiment makes it possible to select an appropriate detection period when the document pressing unit 20 is open regardless of the type of the document pressing unit 20 and other detection period settings and thereby makes it possible to accurately detect a document size.

Next, an image forming apparatus 30 according to a seventh embodiment of the present invention is described. The image forming apparatus 30 of the seventh embodiment includes an image scanning device of any one of the first through sixth embodiments for detecting the size of a document. Therefore, the image forming apparatus 30 provides advantages as described above in the first through sixth embodiments.

Figure 13:
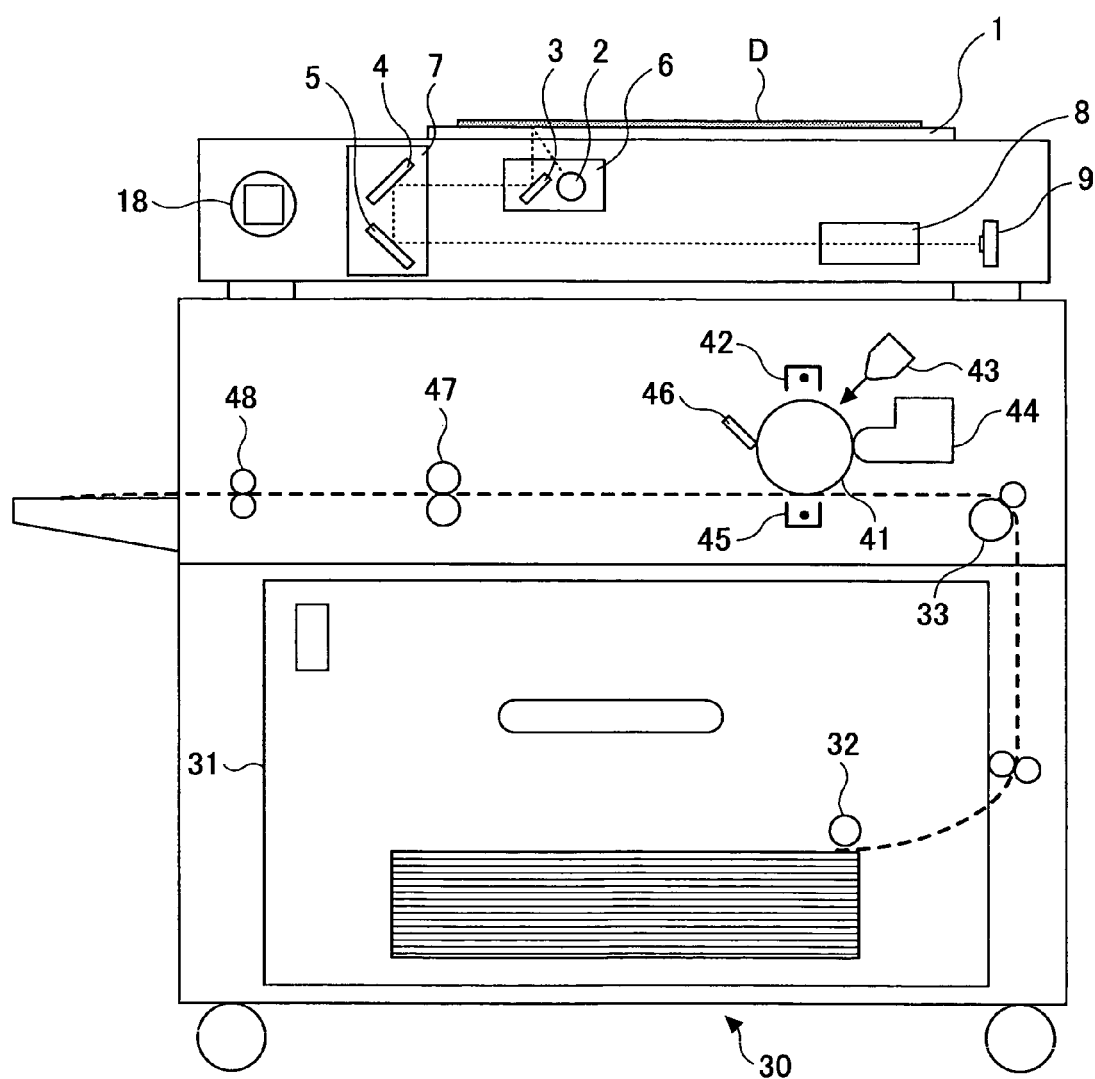
FIG. 13 is a schematic diagram of an image forming apparatus according to a seventh embodiment of the present invention.

FIG. 13 is a schematic diagram illustrating an exemplary configuration of the image forming apparatus 30 of the seventh embodiment. As shown in FIG. 13, the image forming apparatus 30 includes an image scanning device for optical scanning. The image scanning device includes a contact glass 1, a first carriage 6 including a lamp (light source) 2 and a first mirror 3, a second carriage 7 including a second mirror 4 and a third mirror 5, a lens 8, a CCD 9, and a drive motor 18 that includes an encoder (not shown) for measuring the angular speed of its output shaft and drives the first carriage 6 and the second carriage 7.

The image forming apparatus 30 also includes a paper-feed tray 31 for holding paper sheets (or any other types of recording media) and a paper-separating unit 32 for separating and feeding the paper sheets in the paper-feed tray 31 one by one.

The image forming apparatus 30 further includes resist rollers 33 for feeding each paper sheet from the paper-feed tray 31 at a given timing into an image forming unit of the image forming apparatus 30. The image forming unit is configured to form an image on the paper sheet and includes an image carrier 41, a charging unit 42, a latent image forming unit 43, a developing unit 44, a transfer unit 45, a cleaning unit 46, a fusing unit 47, and paper-eject rollers 48.

A control circuit (not shown) of the image forming apparatus 30 of this embodiment controls the image scanning device for optical scanning, drives the first and second carriages 6 and 7 and the rollers for feeding paper sheets, and controls image scanning and image forming processes.

After the size of a document D placed on the contact glass 1 is detected by the image scanning device as described in the above embodiments, the control circuit causes a drive control unit to control a motor driver for driving the drive motor 18 according to a user command. The drive control unit calculates a difference between an angular speed measured by the encoder of the drive motor 18 and a desired angular speed, and performs feedback control on the motor driver based on the calculated difference.

An image signal from the CCD 9 is input to the image processing unit. In the image processing unit, the latent image forming unit 43 forms a latent image on the image carrier 41 based on the image signal, and the developing unit 44 develops the latent image and thereby forms a toner image. Then, the transfer unit 45 transfers the toner image onto the paper sheet being conveyed, the fusing unit 47 fuses the transferred toner image onto the paper sheet, and the paper-eject rollers 48 eject the paper sheet. Thus, the seventh embodiment provides an image forming apparatus including an image scanning device that can accurately detect a document size according to the manner in which the user operates a document pressing unit and taking into account the mechanical variations of an open/close detection unit for detecting opening and closing of the document pressing unit.

As described above, aspects of the present invention provide an image scanning device and an image forming apparatus including the image scanning device that make it possible to set or select an appropriate document size detection period or effective detection period according to the manner in which the user operates a document pressing unit and make it possible to turn on and off a light source according to the set or selected document size detection period or effective detection period. This configuration in turn makes it possible to accurately detect a document size using a photoelectric conversion element, to reduce document size detection errors, and to reduce the power consumption. An aspect of the present invention provides an image scanning device that can accurately detect a document size taking into account the mechanical variations of an open/close detection unit for detecting opening and closing of a document pressing unit.

Aspects of the present invention make it possible to provide an image scanning device and an image forming apparatus with improved document size detection accuracy without increasing the production costs.

The present invention is not limited to the specifically disclosed embodiments, and variations and modifications may be made without departing from the scope of the present invention.

The present application is based on Japanese Priority Application No. 2008-086011 filed on Mar. 28, 2008 and Japanese Priority Application No. 2008-247925 filed on Sep. 26, 2008, the entire contents of which are hereby incorporated herein by reference.

What is claimed is:

1. An image scanning device, comprising:
   a document table;
   a document pressing unit configured to press a document placed on the document table;
   a scanning unit including a light source for illuminating the document and configured to optically scan the document;
   an open/close detection unit configured to detect opening and closing of the document pressing unit; and
   a control unit configured to cause the scanning unit to move parallel to the document and thereby to detect a size of the document when the closing of the document pressing unit is detected by the open/close detection unit or when a scanning start signal is detected;
   wherein the control unit is configured to detect the size of the document within an effective detection period in a document size detection period, and to turn on and off the light source based on the document size detection period, the document size detection period being fixed and the effective detection period being changeable according to a speed of closing the document pressing unit.

2. The image scanning device as claimed in claim 1, wherein the control unit is configured to turn on the light source after a predetermined period of time from a time when the closing of the document pressing unit is detected by the open/close detection unit.

3. The image scanning device as claimed in claim 1, wherein the effective detection period is changeable according to a type of the document pressing unit.

4. The image scanning device as claimed in claim 3, wherein the control unit is configured to automatically detect the type of the document pressing unit and to change the effective detection period based on the detected type of the document pressing unit.

5. The image scanning device as claimed in claim 1, wherein the control unit is configured to select different effective detection periods for a case where the closing of the document pressing unit is detected by the open/close detection unit and a case where the scanning start signal is detected while the document pressing unit is open.

6. An image forming apparatus including the image scanning device as claimed in claim 1.

7. An image scanning device, comprising:
   a document table;
   a document pressing unit configured to press a document placed on the document table;
   a scanning unit including a light source for illuminating the document and configured to optically scan the document;
   an open/close detection unit configured to detect opening and closing of the document pressing unit; and
   a control unit configured to cause the scanning unit to move parallel to the document and thereby to detect a size of the document when the closing of the document pressing unit is detected by the open/close detection unit or when a scanning start signal is detected;
   wherein the control unit is configured to detect the size of the document within a document size detection period that is changeable according to a speed of closing the document pressing unit and a type of the document pressing unit, and to turn on and off the light source based on the document size detection period, and
   wherein the control unit is configured to automatically detect the type of the document pressing unit and to change the document size detection period based on the detected type of the document pressing unit.

8. An image scanning device, comprising:
   a document table;
   a document pressing unit configured to press a document placed on the document tablet;
   a scanning unit including a light source for illuminating the document and configured to optically scan the document;
   an open/close detection unit configured to detect opening and closing of the document pressing unit; and
   a control unit configured to cause the scanning unit to move parallel to the document and thereby to detect a size of the document when the closing of the document pressing unit is detected by the open/close detection unit or when a scanning start signal is detected;
   wherein the control unit is configured to detect the size of the document within a document size detection period that is changeable according to a speed of closing the document pressing unit, and to turn on and off the light source based on the document size detection period, and
   wherein the control unit is configured to select different document size detection periods for a case where the closing of the document pressing unit is detected by the open/close detection unit and a case where the scanning start signal is detected while the document pressing unit is open.

* * * * *